United States Patent [19]

Pokojny et al.

[11] Patent Number: 4,647,718
[45] Date of Patent: * Mar. 3, 1987

[54] ASSEMBLY AND METHOD FOR CABLE JOINT PROTECTION

[75] Inventors: Rudolf Pokojny, San Jose; Peter L. Larsson, Mountain View, both of Calif.

[73] Assignee: Raychem Corporation, Menlo Park, Calif.

[ * ] Notice: The portion of the term of this patent subsequent to Aug. 6, 2002 has been disclaimed.

[21] Appl. No.: 830,251

[22] Filed: Feb. 18, 1986

Related U.S. Application Data

[60] Continuation of Ser. No. 734,629, May 15, 1985, abandoned, which is a division of Ser. No. 374,558, May 3, 1982, Pat. No. 4,533,788.

[51] Int. Cl.⁴ .................. H02G 15/18; H02G 1/14
[52] U.S. Cl. ...................... 174/88 C; 156/49; 174/88 R; 174/92
[58] Field of Search .............. 174/88 C, 88 R, 92, 174/DIG. 8; 156/49, 86

[56] References Cited

U.S. PATENT DOCUMENTS

| | | | |
|---|---|---|---|
| 2,027,962 | 3/1933 | Currie | 174/DIG. 8 |
| 3,086,242 | 4/1963 | Cook | 264/566 |
| 3,297,819 | 1/1967 | Wetmore | 174/88 C |
| 3,455,336 | 11/1965 | Ellis | 138/156 |
| 3,717,717 | 2/1973 | Cunningham | 156/49 X |
| 3,909,500 | 9/1975 | Bereza | 174/88 C X |
| 4,039,745 | 8/1977 | Waldron | 174/88 R X |
| 4,070,746 | 1/1978 | Evans | 29/450 |
| 4,096,350 | 6/1978 | Mayr et al. | 174/88 C |
| 4,135,553 | 1/1979 | Evans | 174/DIG. 8 X |
| 4,142,592 | 3/1979 | Brusselmans | 174/DIG. 8 X |
| 4,164,621 | 8/1979 | Silva | 174/88 C X |
| 4,179,320 | 12/1979 | Midgley | 174/DIG. 8 X |
| 4,200,676 | 4/1980 | Caponigro | 428/57 |
| 4,282,397 | 8/1981 | Sidenberg et al. | 174/92 |
| 4,380,686 | 4/1983 | Moisson | 174/84 R |
| 4,533,788 | 8/1985 | Pokojny et al. | 174/88 R X |

FOREIGN PATENT DOCUMENTS

| | | | |
|---|---|---|---|
| 25691 | 3/1981 | European Pat. Off. | 174/DIG. 8 |
| 108170 | 9/1978 | Japan | 156/86 |
| 1431167 | 7/1976 | United Kingdom . | |
| 1586388 | 3/1981 | United Kingdom . | |
| 1604982 | 12/1981 | United Kingdom . | |
| 2069773 | 2/1984 | United Kingdom . | |

OTHER PUBLICATIONS

Product Brochure of Sigmaform S.A. (Pty) Ltd.
Product Brochure—Pirelli.

Primary Examiner—Arthur T. Grimley
Assistant Examiner—Morris H. Nimmo
Attorney, Agent, or Firm—Edith A. Rice; Herbert G. Burkard

[57] ABSTRACT

This invention relates to the mechanical and environmental protection of cable joints, especially in power or other current-carrying cables. Disclosed is a recoverable sleeve which conforms closely to the cable joint, and a non-profiled liner which bridges the joint and comprises a plurality of elongate elements assembled into a sheet. Flexible means is provided for holding the elements in a side-by-side arrangement and allowing the separation between the elements to vary to allow the liner to conform to the profile of the cable joint. Such flexible means may extend across the element and provide a water vapor barrier. Disclosed also is a method of protecting a cable joint utilizing the sleeve and liner. Where the cables to be jointed have metal armor, screen and/or shielding, the elements may be fabricated from metal or metal alloy and may then provide both armoring and a fault current path across the joint. Use of these more closely conforming joint case assemblies improves heat transfer and reduces the overall size of the joint.

36 Claims, 23 Drawing Figures

FIG_1

FIG_2A

FIG_2B

FIG_2C

FIG_3

FIG_4

FIG_5

FIG_6

FIG_7

FIG_8

FIG_9

FIG_10

FIG_11

FIG_12A    FIG_12B

FIG_13

FIG_14A

FIG_14B

FIG_15

FIG_16

FIG_17A

FIG_17B

FIG_18

ASSEMBLY AND METHOD FOR CABLE JOINT PROTECTION

This application is a continuation, of application Ser. No. 734,629, filed May 15, 1985, abandoned, which is a divisional of Ser. No. 374,558 filed May 3, 1982, now U.S. Pat. No. 4,533,788.

BACKGROUND OF THE INVENTION

1. Field of the Invention

This invention relates to the mechanical and environmental protection of cable joints and other elongate substrates, and more particularly to an assembly comprising a wraparound non-profiled liner and a recoverable sleeve, and to a method of protecting a cable joint which utilizes such an assembly.

2. Discussion of the Art

Certain cables may require additional mechanical and environmental protection, especially in joint areas, if they are to be reliable over long periods. In joint areas, protective layers may have been stripped away in order to make the joint, and ordinarily must be replaced by protection equally as good. This is generally true whether the cables are current-carrying (i.e., power distribution of transmission, telecommunication, or cable television), optical fiber, or other. This discussion applies to the jointing of all types of cables where joint cases may be used, although for the sake of clarity, it will focus on current-carrying cables.

Current-carrying cables generally comprise one or more conductors which may be of solid metal or of stranded construction, and which are typically of copper or aluminum. They are insulated from one another by materials such as oil impregnated paper or polymers, which may be cross-linked to give them superior properties. Individually insulated conductors are known as cores. The type and amount of insulation are determined largely by the voltage rating of the cable in the case of power cables or by the need for mechanical strength in the case of telecommunication cables.

The core insulation may be surrounded by one or more sheaths. Oil impregnated paper insulation, used for some power cables, is typically surrounded by a metal sheath, generally of lead or aluminum, to protect the insulation from moisture. Polymer insulated power cables may require the additional insulation provided by one or more polymeric sheaths generally applied by extrusion.

The core or cores may be surrounded by a layer of metal armor, screen and/or shielding in the form of wire, sheet, mesh, screen or tape, generally of steel or aluminum, which may provide a path to ground and carry fault currents. Armoring in addition provides longitudinal strength and mechanical protection, especially desirable for buried cable. For some applications, these metal components may be covered by or embedded in a compound to prevent the ingress of moisture. High voltage power cables may have each core surrounded by its own screen or shielding, but there is usually only one metal armor layer positioned near the outer protective jacket.

An outer protective jacket typically provides further electrical, mechanical and environmental protection, and polymer layers such as polyvinyl chloride are commonly employed.

A preferred joint enclosure for telecommunication cables is a recoverable polymeric sleeve, preferably a heat-shrinkable polymeric sleeve. Polymeric heat-recoverable materials and articles formed therefrom are disclosed in U.S. Pat. Nos. 2,027,962 to Currie and 3,086,242 to Cook et al, both of which are herein incorporated by reference. Recoverable articles which are recoverable without heat are disclosed in U.S. Pat. Nos. 4,070,746 to Evans et al, 4,135,553 to Evans et al and 4,179,320 to Midgley et al, all of which are herein incorporated by reference.

These sleeves may be tubular, requiring positioning around one cable end prior to jointing and subsequent repositioning around the joint, or they may be of wraparound design, such as those disclosed in U.S. Pat. Nos. 3,455,336 to Ellis and 4,200,676 to Caponigro et al, both of which are herein incorporated by reference. A layer of mastic or adhesive may be interposed between the jointed cables and the sleeve to provide water-tight environmental sealing, especially desirable for buried cable. Wrappable sleeve enclosures are preferred for buried cable to minimize trench length and excavation costs.

An inner protective liner is desirably positioned around the cable joint before installation of the sleeve to provide additional mechanical protection. These liners generally bridge the joint and provide support for the recovered sleeve. Improved impact resistance, especially necessary for buried cables with rock backfill, is provided. Known liners may be of tubular design, or may be wraparound split-tubes, half-shells or sheet. A wraparound liner, suitable for a telecommunication splice case and comprising a fibrous sheet support and a vapour impermeable metal layer is disclosed in U.K. pubished application No. 2,059,873, the disclosure of which is incorporated herein by reference. A thermoplastic support layer with a foamed polymeric heat barrier layer is disclosed in U.K. published application No. 2,069,773, the disclosure of which is also incorporated herein by reference. Sheet liners may have fold lines to facilitate wrapping, and crowned ends to facilitate neck-down onto the cables, as taught in, for example, U.S. Pat. Nos. 4,380,686 and 4,472,222.

Enclosures for joints in power cables are similar to those used for joints in telecommunication cables etc., although there are certain differences. Bitumenfilled metal or concrete molds were originally used for joint enclosures, later replaced by resin-filled boxes of steel, cast iron, lead or tinned copper, and today recoverable polymeric sleeves and liners are used, such as those disclosed in U.S. Pat. Nos. 4,142,592 to Brusselmans and 4,282,397 to Siedenburg et al, the disclosures of which are herein incorporated by reference. The cables will generally have a metal sheath, screen, shielding, or armoring, which should be interconnected across the joint to provide continuity of shielding or of mechanical protection or to provide a fault current path. A metal box, metal liner, metal braid or metal tape may provide the desired electrical continuity.

Power cables generate a significant amount of heat in operation, and the conductor of a polymer insulated power cable, for instance, may reach a temperature in normal operation of 70° C., be rated for maximum continuous operation of 90° C. and have a short-term rating of 130° C. Heat transfer from the cable to the environment can become critical, since insulation degradation is generally an exponential function of temperature. A liner which comprises a generally solid-wall canister can, therefore, under certain circumstances has the double disadvantage of unnecessary bulk and the poor heat transfer that results from the entrapment of an insulating layer of air. The only satisfactory way of avoiding the overheating that follows is to fill the canister with a heat conductive potting compound.

SUMMARY OF THE INVENTION

The instant invention can overcome the disadvantages set forth above by reducing the overall size of the joint case and by improving its heat transfer characteristics, while providing adequate mechanical support, electrical properties or environmental protection as desired.

Thus, the instant invention provides an assembly for enclosing an elongate substrate of non-uniform cross-sectional size, which comprises:
  (a) a recoverable sleeve which can be positioned longitudinally around the substrate; and
  (b) a liner comprising a plurality of longitudinally arranged elongate elements such that on positioning said liner longitudinally around the substrate, said elongate elements are spaced around the substrate; the elements being capable of conforming to a change in cross-sectional size of the substrate and being held together by means which allows the separation between them to vary, without the elements twisting, along the change in cross-sectional size of the substrate.

In another aspect of the invention, there is provided a wraparound liner which can surround longitudinally a cable splice or non-uniform cross-sectional size, which comprises:
  (a) a plurality of side-by-side elongate elements which have a non-linear configuration corresponding substantially to the profile of the cable splice; and
  (b) means which holds the elements together and which allows the separation between them to vary at a change in cross-sectional size of the cable splice as the liner is installed around the cable splice.

The invention also provides a method of enclosing an elongate substrate of non-uniform cross-sectional size, which comprises:
  (a) wrapping longitudinally around the substrate a liner comprising:
      (i) a plurality of side-by-side elongate elements; and
      (ii) means which holds the elements together and which allows the separation between them to vary at a change in cross-sectional size of the substrate during installation;
  (b) placing around the liner a recoverable sleeve; and
  (c) recovering the sleeve into engagement with the substrate.

BRIEF DESCRIPTION OF THE DRAWINGS

The invention may be better understood by referring to the detailed description of the invention when taken in conjunction with the accompanying drawing in which:

FIG. 2A corresponds to the liner of FIG. 1.

DETAILED DESCRIPTION OF THE INVENTION

The assembly of this invention can match closely a cable joint or other elongate substrate, thus avoiding unnecessary bulk and reducing the amount of insulating air in the assembly. Where the change in cross-sectional size of the substrate is not too sharp, it is expected that the instant liner will be able to conform to the substrate exactly; and for other substrates a substantial matching of liner and substrate can be achieved. The change in size referred to is primarily a change in the size of the periphery, and not a change in cross-sectional area that would result from a constant peripheral size changing shape. This close fit is not normally possible with the rigid, solid-walled, canisters which have been used in the past.

The assembly comprises two main parts: a liner which may be preformed to match the substrate, or which has sufficient flexibility that it can be deformed on site to the shape required; and a recoverable sleeve. The liner may be bent or otherwise deformed to shape and then slid over or wrapped around the substrate, or it may be installed in substantially cylindrical form and the recovery forces of the sleeve allowed to deform it to match the substrate. Where the primary function of the liner is mechanical strength, for example against axial load, it may be desirable that the liner be formed from material too strong to be deformed by the recovery forces of the sleeve; in such cases the liner is preferably pre-shaped at some stage during its manufacture. Where the liner is chosen for its electrical properties, screening or fault detection for example, a weaker material may be sufficient in which case deformation during installation may be preferred.

The liner itself has as its two main components a plurality of elongate elements arranged side-by-side, which provide the properties of mechanical strength or electrical continuity, and some form of connection between them, which allows the liner to follow the substrate with the desired degree of exactness. The elongate elements may have any suitable cross-sectional shape, although a rectangular or circular shape is preferred, and are preferably sufficiently long where the substrate is a cable splice, to provide full strain relief across the joint.

The elongate elements are arranged side-by-side to form a cage-like structure around the substrate. Where the substrate increases in size, the liner does too, and this is accomplished as follows: each elongate element has a configuration which corresponds to the profile of that part of the substrate which underlies it, and as a result cylindrical parts of the substrate will be surrounded by an array of virtually parallel elongate elements; and where the substrate thickens or tapers, the elongate elements will respectively diverge or converge. It is because the elements must be able to diverge or converge at the changes in size of the substrate that the design of the means for holding the elements together is limited.

Where the liner is manufactured in a tubular configuration with a profile preformed to match the substrate, then any interconection between adjacent elements can be of a size and shape chosen to match the statically varying separation of the elements along the length of the liner. A preferred means for holding the elements together is sheet material which bridges the elements and which is bonded to them, preferably by means of a mastic or pressure sensitive adhesive. In the manufacturing technique now considered, such sheet material could simply be applied around the array of elongate elements (which could be held for the purpose in a jig) and would thus automatically account for the variation in the separation between the elements.

Where, however, the liner is manufactured as a generally flat structure, to be wrapped around the substrate on site, or where part of the liner changes in cross-sectional size during installation, the means for holding the elements together must allow for movement between the elements, rather than for a static variation in separation along the length of the liner.

This movement between the elements is preferably allowed for in one of three ways. Firstly, the sheet material which bridges the elements, or other means for holding the elements together, is positioned across the elements only at regions which will have some uniform cross-sectional size. Separate pieces of sheet material can of course be used, each at a region of different but uniform cross-sectional size.

The second technique is, to use as the holding means, a material which can stretch at those positions where the elongate elements must move farther apart. This would be used primarily for a wraparound liner, since it would allow the following manufacturing process to be employed. A series of elongate elements are arranged side-by-side and preferably touching. This array of elements is provided with a backing of sheet material, and the array plus backing is then deformed to give each elongate element a non-linear configuration corresponding to the profile of the substrate to be enclosed. The deformation could be made first, and the backing added later. When this array is wrapped around a substrate, a part of the elements will remain touching, but those parts deformed out of the original plane of the array will move apart from each other, requiring the sheet material to stretch, and forming a portion of greater cross-sectional size, which in a preferred use of this invention will surround the thicker central region of a cable splice. The extent that the elements move apart will depend on the radius of curvature at which the liner is wrapped, as well as on the extent of the deformation of each element. This analysis of what happend when the liner is wrapped around a substrate is also relevant to all of the three techniques being discussed, but where the sheet material is unyielding, it would have to be omitted from regions where the elements diverge, or alternatively added separately and providing slack which could be taken up on installation.

The third possibility is to apply the sheet material to the elements when they are fully separated installation causing them to become closer. This arrangement is perhaps most relevant where the liner is assembled around the substate as a cylinder and then deformed down onto the smaller parts of the substrate be recovery of an outer sleeve or otherwise. Here slack will be generated in the sheet material where the elements move together. It is preferred that fold lines be provided in the material at appropriate places to ensure neat accommodation of the slack material.

Although these three techniques, which are not mutually exclusive, have been described in terms of sheet material as the means for holding the elements together, the same considerations apply to other means for holding, such as hooks and thread. Such other means are referred to below in conjunction with the drawings.

The elongate elements allow a casing to be formed which conforms closely to an irregular substrate with all the advantages which this offers. Furthermore, this close conformation is achieved remarkably easily without damaging the integrity of the liner, since the joins between the elongate elements are so structured or so positioned that the elements can diverge or converge at the correct position without the elements twisting. Thus, on installation, the liner automatically can assume the desired shape and, in a preferred embodiment, does automatically assume the desired shape simply on being rolled into a tubular configuration.

The following discussion relates more specifically to a preferred embodiment of the invention where the substrate to be enclosed is a joint in a power cable. The substrate therefore has two end regions of smaller cross-sectional size and a central section of larger cross-sectional size. A similar profile will result when a single damaged cable is to be repaired and when a joint between a cable and a piece of equipment is to be enclosed.

The liner preferably has a contour having a center section and end sections which in combination conform closely in use to the shape of the joint zone, the center section being generally arched to accommodate the joint itself and the end sections contacting the cables, generally where they have been bared of their outer jackets. The center section may assume one of many shapes (e.g., round, oblate, angular, segmental, etc.), but any angular portion which contacts the recoverable polymeric sleeve subtends an angle preferably greater than about 90°, more preferably greater than about 120°, and most preferably greater than about 135°. The desired configuration may be imparted to the elongate elements of the liner either before or after assembly by a variety of methods, such as stamping or molding, or if a light guage material is used, simple bending by hand may be sufficient. Where the cross-section of the substrate is non-circular, different elongate elements will be deformed to different extents.

The generally arched section of the liner need not be mid-way between the ends. An asymmetric positioning can sometimes be advantageous. As an example, the cores of a multicore buried power cable may be individually insulated by heat-shrinkable tubular sleeves after splicing and before installation of a joint case. Such sleeves are slid onto one of each pair of cables to be jointed, the joint made, and the sleeve slid along over the joint and then recovered. As a result, the length along each cable pair to which access must be gained is assymetric with respect to the joint. Since less access is needed on one side of the joint than the other for installation of the primary tubular sleeves, the trench that has to be dug can be smaller if the joint is made towards one side of the trench. A liner for the resulting splice should therefore by assymetrically constructed. This assumes that both the liner and the outer recoverable sleeve are wraparound, since if they are tubular, they too must be slid along the cables requiring an even larger trench. Where excavation costs are significant or where the cable to be attended to is a single core of a multi-core cable where the other cores do not need attention, then a completely wraparound system may be preferred. In other situations, tubular products may be preferred.

The wraparound design of liner allows any one liner to be used over a wide variety of sizes of cable joints, since the extent of overlap can be varied. This reduces inventory costs and allows a double or greater thickness of liner to be used where greater strength or electrical protection is required. Where the liner is wraparound, it may be desirable to provide some means for holding the liner in position while the outer sleeve is installed. Tapes are ideal for this purpose.

The elongate elements may be chosen according to the particular cable to be enclosed. The elements may be metal or metal alloy strips, rods or wires and thus serve as armoring to improve static and impact load resistances, giving the greatest measure of physical support to the cable joint, which is especially valuable for buried cables. They may also serve as electrical interconnection between the metal armor, sheath, screen or shielding of the cables to be jointed.

Metal elongate elements are preferred for use with power cables, and rectangular metal strips are most preferred for jointing armored power cables. Such elongate elements preferably have a width of at least about 5 mm, preferably at least about 10 mm and/or a thickness of at least about 0.5 mm, preferably at least about 1 mm, especially at least about 3 mm.

Steel is the preferred metal, especially galvanized steel, although other metals are useful, such as copper or aluminum. Zinc coatings on ferrous metals such as galvanized steel, serve as protective coatings against corrosion. Other useful protective coatings comprise polymers, such as curable epoxy resins. Coatings applied to the elongate elements can also improve adhesion of any adhesive materials which contact the elongate elements.

The elements may be made from a broad range of materials, alone or in combination, providing the elements can be made to conform to the shape of the substrate. Examples of suitable materials include; sheet metal, molded plastic, rigid fibrous sheet and impregnated woven fabrics, which may be used separately or as laminates. The choice of materials will of course depend on the cables to be jointed.

As mentioned above, the means for holding the elements together is preferably one or more pieces of sheet material which bridge the elements and to which the elements are bonded. Each piece of sheet material may comprise one or more strips of tape, which are preferably positioned either exclusively on the end sections of the elongate elements or exclusively on their center section.

It is preferred, however, that the sheet material substantially completely covers at least the end sections or the center section of the array of elements. Most preferably, it substantially covers the entire sheet array on one side thereof and is comprised of a vapour impermeable material such as a metal foil. This imparts additional moisture barrier protection to the joint case, but at the expense of heat transfer ability. Unlike power cables, fiber optic, cable television and telecommunication cables do not generally have an overheating problem and this embodiment of the invention is therefore especially useful with these types of cables. Telecommunication cables are frequently filled with a hydrophobic filling compound. This embodiment of the invention leads itself especially well to filled joint case applications, the liner acting as a container for filling compound advantageously eliminating the need for a separate inner liner or bag. Where the liner acts as a mold for a filling compound, an outer sleeve may be unnecessary.

Instead of a metal foil, the sheet material may be a polymeric material such as a polyester, for example, that marketed under the trademark Mylar. In a preferred embodiment, a laminate of Mylar-aluminum foil-Mylar is used. As an alternative to a simple sheet material, a sheet fabric such as woven fiberglass may be used. The sheet material is preferably positioned on the inside of the liner for the following reason: the elongate elements may be cut from a sheet of galvanized or other surface treated material, and as a result, will lack a protective coating on their cut edges, and the arrangement preferred allows a sealant coating on the outer sleeve to penetrate between adjacent elements, thus sealing these cut edges and providing a strong keyed product.

The means for holding the elongate elements together is preferably highly flexible. Where the liner is a wraparound liner, flexibility will of course allow it to be wrapped easily around a substrate. Such flexibility is, however, also useful in a tubular liner since it allows the liner to assume any cross-sectional shape having a certain cross-sectional size. Unless the means which holds the elements together also function as a vapour barrier, for example, such means may only temporarily hold the elongate elements together, since once the joint case is installed, the means is no longer generally necessary. Thus the sheet material, for example, need not be resistant to the temperatures encountered in cable operation nor during installation of the recoverable outer sleeve, unless the possibility of re-entry is desired. Where the sheet material includes a heat-resistance layer, it serves the added function of providing a heat barrier layer. A heat barrier layer is likely to be useful when the outer sleeve is recovered by means of heat or where sealing involves the activation of a hot-melt or other heat activatable adhesive. Telecommunication cable splices, which involve joints between many small and delicate wires, are preferably provided with a heat barrier layer.

Brief mention will now be made of some alternative means for holding the elongate elements together. A plurality of malleable solder dots may be employed to connect adjacent metal bridging elements, or a plurality of strands of materials (such as fiberglass yarn or metal wire) may be woven around the bridging elements, in the way that sun shades are held together. One or more flexible strips of fabric or other material may be employed, each strip having a plurality of paired apertures through which the elongate elements may be threaded, thereby holding them in the desired spatial array. Alternatively, one may use one or more flexible strips or tubes having a plurality of lateral apertures through which the bridging elements may be press-fitted, each aperture being of such size that the elongate element is an interference fit through it. Flexible strips may be formed by injection molding of a polymer, such as polypropylene, and flexible tubing may be formed by extruding a polymer such as polyethylene.

Where the elongate elements are perforated, a plurality of strands of material (such as fiberglass yarn) may be laced alone or in combination or sewn through the perforations. Perforated elements may also be held together by connectors, such as hooks, which link adjacent elements. Alternatively, the connectors may comprise two or more strips of material (such as molded polymers) having spaced protuberances on one surface, which are an interference fit into holes in the elongate elements. The holes could of course be provided in the connectors and the protrusions on the elongate elements.

A recoverable sleeve is positioned around, and preferably extends beyond the liner in order that it may be recovered around the liner and into contact with the cable, thereby environmentally sealing the cable joint. In some situations, however, environmental sealing may not be necessary, in which case the sleeve may not be needed or it may need simply to engage the liner to urge the liner against the cable splice to hold it in position. In other situations the sleeve need to recoverable only at its end.

Polymeric heat-recoverable materials and articles formed therefrom are disclosed, for example, in U.S. Pat. Nos. 2,027,962 to Currie and 3,086,242 to Cook et al, both of which are herein incorporated by reference. The recoverable material can be, for example, polyethylene, polyvinyl chloride, polyvinylidene fluoride, or the like. Cross-linked polyethylene is preferred. Recoverable polymeric articles will recover generally by shrinking back to or towards their original heat-stable configuration when heated to a temperature above their crystalline melting temperature, for example, about 115° C. in the case of polyethylene. Recoverable metals are also known, such as beta-brasses, and titanium and nickel alloys.

Recoverable sleves are also known which do not require the application of heat. Such articles are disclosed, for example, in U.S. Pat. Nos. 4,070,746 to Evans et al, 4,135,553 to Evans et al and 4,179,320 to Midgley et al, all of which are herein incorporated by reference.

The asemblies according to this invention may further comprise a means for sealing at least end portions of the sleeve to the cables at either side of the cable joint. The sealing means may comprise a mastic, an adhesvie, or simply a sealing means having no tackiness or adhesion. When the sealing means comprises an adhesive, it may be, for example, a pressure sensitive adhesive, a hot-melt adhesive, or an epoxy or other reactine system. When recovery of the sleeve is accomplished by heating, the bonding means preferably comprises a hot-melt or other heat activated adhesive, especially a hot-melt adhesive whose tack temperature does not exceed the recovery temperature of the sleeve. In order to ensure that the correct bond line temperature is reached and to avoid excessive heating, the outer surface of the sleeve may contain a temperature indicating paint or other composition.

When the cables to be jointed are power or other current-carrying cables having metal armor or a screen and/or shielding which may carry fault current, electrical interconnection across the joint may be provided by the elongate elements of the liner which may then complete a ground path or fault current path. Where the elongate elements are to perform this function, it will be necessary for them to be electrically connected to the cable armor. Such electrical connection may be made by, for example, solder, a hose clamp, or by a rollspring clamp.

The invention will now be further described with references to the accompanying drawings which illustrate various features of wraparound liners. Wraparound liners are, in general, preferred since they require less space for installation, do not require the substrates to be completely severed, and can be supplied and stored flat which allows stacking to save space. This last feature of space saving offers an advantage over other types of wraparound liners such as metal canisters or half-shells which cannot be stacked flat.

Figure 1:
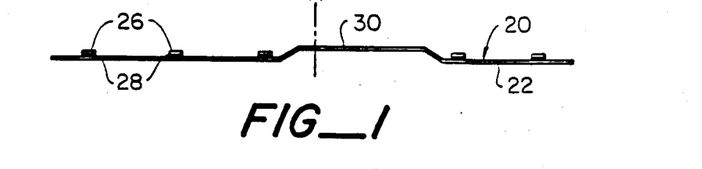
FIG. 1 is a side elevation of a liner according to this invention.
Figure 2A:
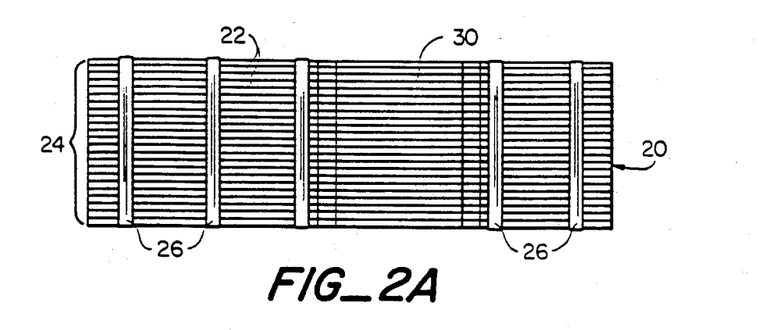
FIGS. 2A, 2B and 2C are plan views of liners wherein the elongate elements are metal strips which are held side-by-side by adhesive tape.

Referring to FIGS. 1 and 2A, a pre-shaped wraparound liner, 20, according to this invention is shown in side elevation and plan view respectively. Elongate elements, 22, are shown as metal strips which are held together in a sheet array, 24, by a series of flexible strips of Mylar, 26, bonded to the bridging elements, 22, by a pressure sensitive adhesive, 28.

The liner, 20, has a region, 30, asymmetrically positioned with respect to a certerline, A, shaped to conform closely to a cable joint.

Figure 2B:
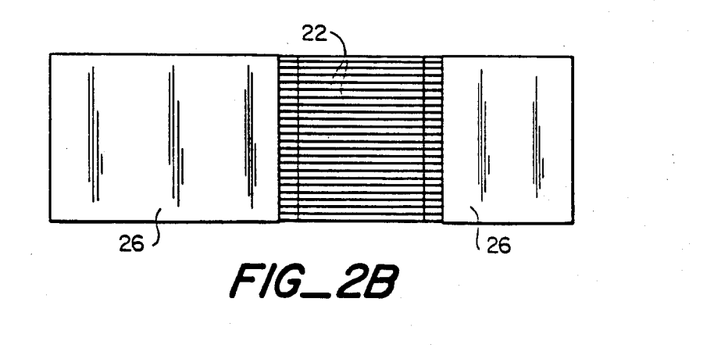
Figure 2C:
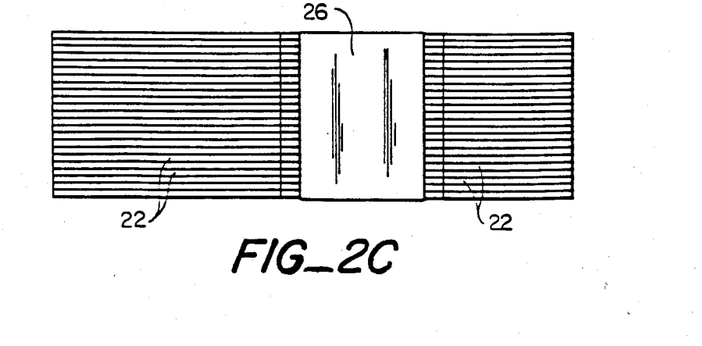

FIGS. 2B and 2C are plan views of liners showing alternative positioning of the strips, 26, which as before, are sheets of adhesive backed Mylar. It is preferable to position the strips or other means for holding either exclusively on the end sections of the elongate elements or exclusively on the center setion.

Figure 3:
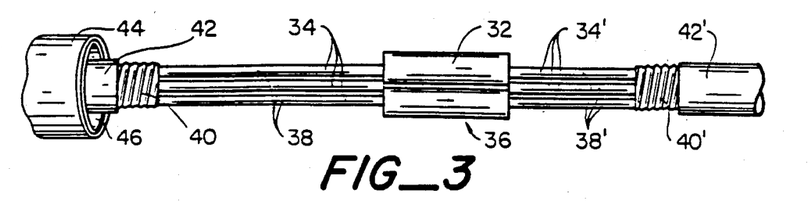
FIG. 3 is a side elevation of an in-line joint in a three core power cable made after stripping back the cable jacket, armor and insulation from the cable ends and after positioning a recoverable sleeve over one cable end.

FIG. 3 shows a joint, 32, in a three core power cable. The cores in the cables, 34, 34′, have been jointed in the region, 36. Before jointing the cores, insulating sheaths, 38, 38′, armoring, 40, 40′, and outer jackets 42, 42′, were stripped back, and a heat-recoverable polymeric sleeve, 44, having a hot-melt adhesive layer, 46, on an inner surface was positioned over one cable end.

Figure 4:
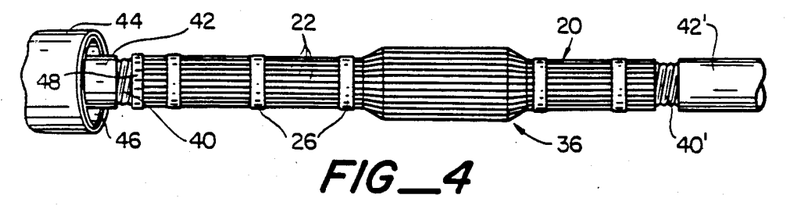
FIG. 4 is a side elevation of the power cable of FIG. 3 around which has been wrapped the liner of FIGS. 1 and 2A.

FIG. 4 shows a wraparound liner, 20, installed around a cable joint, 32. The bridging elements, 22, are then physically and electrically joined to the cable armoring, 40, 40′, by means of hose clamps, 48, only one of which is shown in the drawing.

Figure 5:
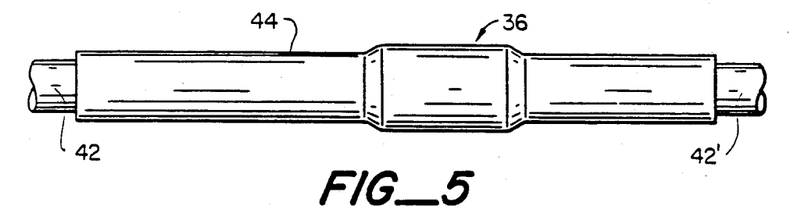
FIG. 5 is a side elevation of a cable joint according to this invention after installation of the liner of FIGS. 1 and 2A and a recoverable sleeve.

FIG. 5 shows the finished joint case after a polymeric sleeve, 44, has been positioned over the joint region, 36, and recoverd into contact with the cable jackets, 42, 42′, to form an environmental seal.

Figure 6:
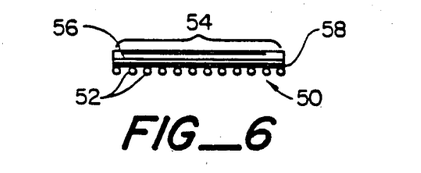
FIG. 6 is an end elevation of a liner according to this invention wherein the elongate elements are rods which are held side-by-side by a sheet of adhesivebacked metal foil.
Figure 7:
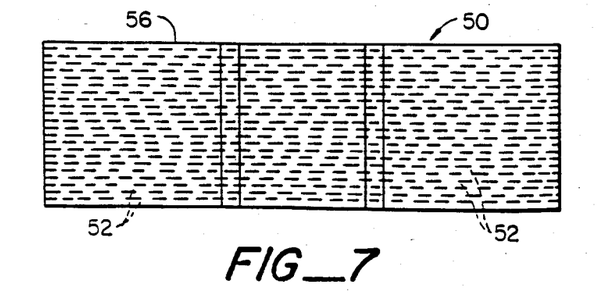
FIG. 7 is a plan view of the liner of FIG. 6.

FIG. 6 shows in end elevation, an alternative liner, 50, comprising rods or wires, 52, held together in a sheet array, 54, by a sheet of metal foil, 56, which is bonded by an adhesive, 58, to one side of the elongate elements. FIG. 7 shows this same liner in plan view, where it can be seen that the foil, 56, substantially entirely covers the array of rods or wires, 52.

Figure 8:
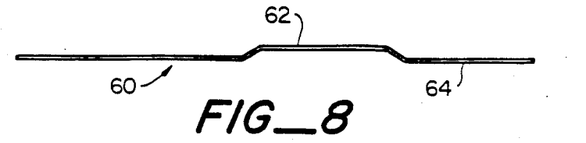
FIG. 8 is a side elevation of a liner according to this invention which is a slotted sheet.
Figure 9:
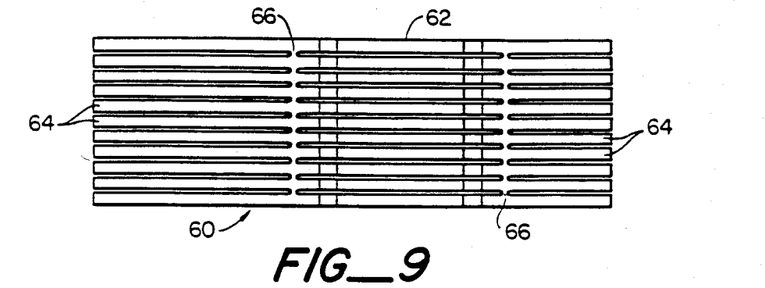
FIG. 9 is a plan view of the liner of FIG. 8 showing more clearly its details.

FIG. 8 is a side elevation of wraparound liner 60 formed from a slotted sheet, 62. In FIG. 9, a plan view of the same liner as FIG. 8, elongate elements, 64, are shown as having interconnecting portions, 66, therebetween. Two interconnecting portions, 66, join each pair of adjacent elements, 64, but the elements are not joined together at the far left and right hand sides as drawn, thus allowing the liner to conform to a substrate in the way required.

Figure 10:
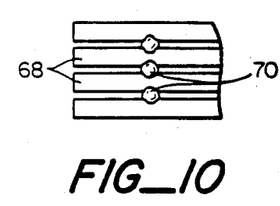
FIG. 10 is a partial plan view of a liner showing elongate elements which are strips held together by malleable solder dots.
Figure 11:
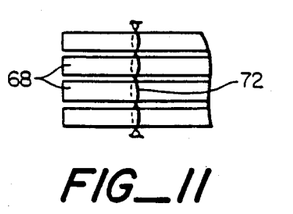
FIG. 11 is a partial plan view of a liner in which the elongate elements are held together by a pair of strands of material which are woven around each element.

FIGS. 10 through 17A and B show in partial views (except for the full view of 12B), alternative means for holding the elements, 68, in a sheet array. In FIG. 10, a plurality of malleable solder dots, 70, have been employed to connect adjacent metal elements, 68. In FIG. 11, a pair of strands of yarn, 72, have been woven around the elements, 68.

Figure 12A:
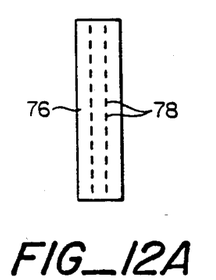
FIG. 12A is a plan view of a flexible strip of material having paired slits through which the elongate elements may be threaded to hold them side-by-side.
Figure 12B:
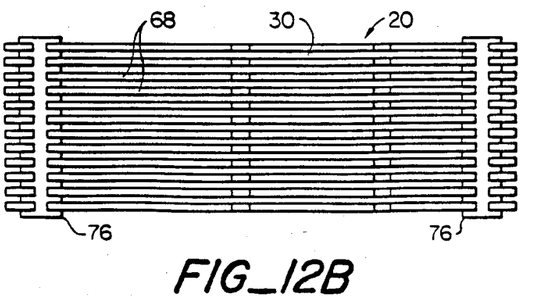
FIG. 12B is a plan view of a liner, the elongate elements of which are held together by the flexible strips of FIG. 12A.

In FIG. 12A, a flexible strip of material, 76, having a plurality of paired slits, 78, through which the elements, 68, may be threaded thereby holding the elements in the desired sheet array, is shown in plan view. FIG. 12B shows in plan view, a pair of such flexible strips, 76, after the elements, 68, have been threaded therethrough.

Figure 13:
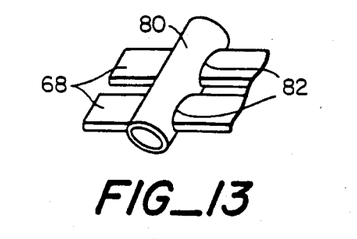
FIG. 13 is a partial plan view of a liner, the elongate elements of which are held together by a flexible tube having lateral apertures through which the elements have been fitted.

FIG. 13 shows in partial plan view a flexible tube of material, 80, having a plurality of lateral apertures, 82, through which the elements, 68, may be press-fitted.

Figure 14A:
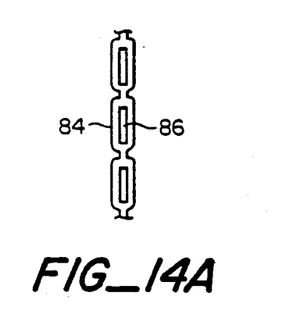
FIG. 14A is an end elevation of a flexible strip having a plurality of lateral apertures through which the elongate elements may be fittd.
Figure 14B:
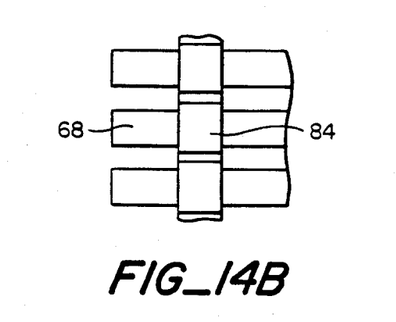
FIG. 14B is a partial plan view of a liner showing elongate elements held together by the flexible strip of FIG. 14A.

In FIG. 14A, a flexible strip of material, 84, having a plurality of lateral apertures, 86, through which the elements, 68, may be press-fitted is shown in a partial side view. FIG. 14B shows in a partial plan view, the flexible strip, 84, after the elements, 68, have been inserted therethrough.

Figure 15:
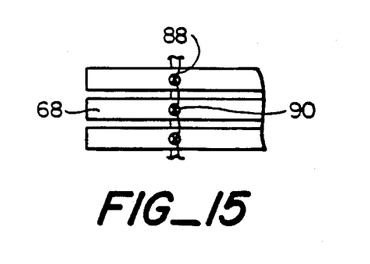
FIG. 15 is a partial plan view of a liner, the elongate elements of which are perforated strips held together by a pair of strands of material which are sewn through the perforations.
Figure 16:
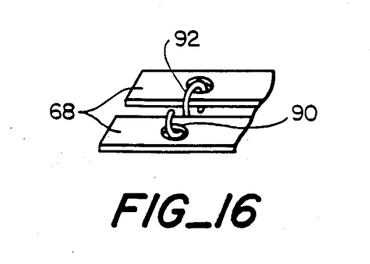
FIG. 16 is a partial plan view of a liner, the elongate elements of which are perforated strips held together by a hook which links adjacent strips.
Figure 17A:
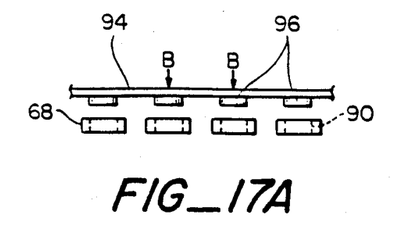
FIG. 17A is an end elevation of a liner, the elongate elements of which are perforated strips which can be held together by a strip of tape having spaced protuberances on one surface which fit into said perforations.
Figure 17B:
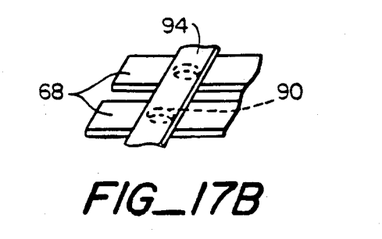
FIG. 17B is a partial plan view of the liner of FIG. 17A showing the protuberances of the tape engaged with the perforations.

In FIGS. 15 through 17A and B, the elements, 68, have been perforated to allow lacing, sewing, etc. therethrough. FIG. 15 shows a pair of strands of yarn, 88, laced or sewn through perforations, 90. Elements, 68, may be linked by a hook, 92, as shown in FIG. 16. In FIG. 17A, a strip 94, is shown having spaced protuberances, 96, molded integrally on one of its surfaces, which can be press-fit into perforations, 90, by applying pressure at points B. In FIG. 17B, the strip connector, 94, is shown after installation.

Figure 18:
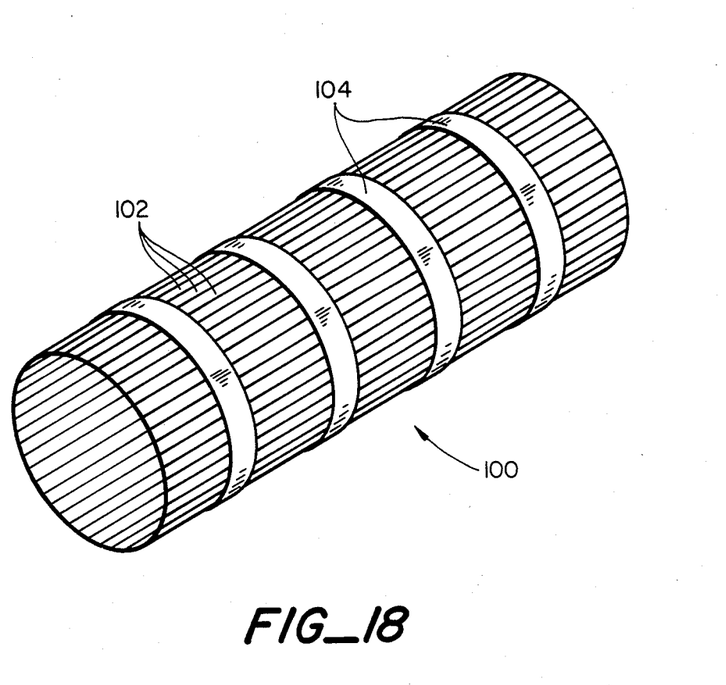
FIG. 18 illustrates a liner according to this invention having a tubular configuration of uniform cross-sectional size along its whole length.

In FIG. 18, liner 100 has elongate elements 102 joined with strips of Mylar 104. The elongate elements 102 are essentially flat so that liner 100 has a tubular configuration of uniform cross-section along its whole length.

While the instant invention has been described by reference to what is believed to be the most practical embodiments, it is to be understood that the invention may embody other specific forms not departing from the spirit of the central characteristics of the invention. It should be understood that there are other embodiments which possess the qualities and characteristics which would generally function in the same manner and should be considered within the scope of this invention. The present embodiments therefore should be considered in all respects as illustrative and not restrictive, the scope of the invention being limited solely to the apended claims rather than the foregoing description and all equivalents thereto being intended to be embraced therein.

What is claimed is:

1. An assembly for enclosing an elongate substrate of non-uniform cross-sectional size, which comprises:
    (a) a recoverable sleeve which can be positioned longitudinally around a substrate; and
    (b) a liner comprising a plurality of longitudinally arranged elongate elements of metal substantially rectangualr in cross-section having a width of at least 5 mm and a thickness of at least 0.5 mm, and extending substantially the whole length of the liner, such that on positioning said liner longitudinally around a substrate, said elongate elements are spaced around a substrate;

the elements being capable of conforming to a change in cross-sectional size of a substrate and being held together by means which allows the separation between them to vary, without the elements twisting, along the change in cross-sectional size of a substrate.

2. An assembly according to claim 1, in which the sleeve is a wraparound sleeve.

3. An assembly according to claim 1, in which the sleeve is recoverable over only a portion thereof.

4. An assembly according to claim 1, in which the recovery force of the sleeve is sufficient to deform the elements substantially to conform to the change in cross-sectional size of a substrate.

5. An assembly according to claim 1, in which the sleeve is heat-recoverable.

6. An assembly according to claim 1 or 5, in which the sleeve shrinks on recovery.

7. An assembly according to claim 1, in which the sleeve has on its inner surface a sealant or adhesive.

8. An assembly according to claim 5, in which the sleeve has on its inner surface a heat-activatable adhesive.

9. An assembly according to claim 8, in which the heat-activatable adhesive is a hot-melt adhesive.

10. An assembly according to claim 5, 8 or 9, in which the sleeve has on its outer surface a temperature indicating coating.

11. An assembly according to claim 1, in which the liner is a wraparound liner.

12. An assembly according to claim 1, in which the liner is a tubular liner.

13. An assembly according to claim 1, in which the means which hold the elements together comprises a plurality of hooks each hinging an element to an adjacent element.

14. An assembly according to claim 1, in which the means which holds the elements together comprises a plurality of strands of material woven around the elements.

15. An assembly according to claim 1, in which the elements are perforated, and the means which holds the elements together comprises a plurality of strands of material which pass through the perforations.

16. An assembly according to claim 1, in which the means which holds the elements together comprises sheet material which bridges adjacent elements and to which the elements are bonded.

17. An assembly according to claim 16, in which the sheet material has a pressure sensitive adhesive coating, by means of which the elements are bonded to it.

18. An assembly according to claim 16, in which the sheet material is tape.

19. An assembly according to claim 16, in which the liner has a region that will be of uniform cross-sectional size when positioned longitudinally around the substrate.

20. An assembly according to claim 19, in which said region of uniform cross-sectional size is covered by a piece of sheet material.

21. An assembly according to claim 16, in which the liner has a region that will be of uniform crosssectional size when positioned longitudinally around a substrate and said means which holds the elements together is present only at said region of uniform crosssectional size, thus allowing the separation between the elements to vary along the length of the liner.

22. An assembly according to claim 16, 19 or 20, in which the sheet material comprises a metal foil.

23. An assembly according to claim 16, 19 or 20, in which the sheet material comprises a metal foil having a plastic film laminated to each side.

24. An assembly according to claim 16, 19 or 20, in which the sheet material is bonded to the inside of the liner.

25. An assembly according to claim 1, in which the elongate elements are integral with the means by which they are held together, interconnections between adjacent elements being so positioned as to allow said separation to vary.

26. An assembly according to claim 25, in which the elongate elements and the means by which they are held together comprise a unitary slotted sheet.

27. An assembly according to claim 26, in which the slotted sheet is laminated with a foil sheet.

28. A combination comprising a substrate of non-uniform cross-sectional size, enclosed by an assembly comprising:
   (a) a recovered sleeve positioned longitudinally around the substrate; and
   (b) a liner comprising a plurality of longitudinally arranged elongate elements of metal substantially rectangular in cross-section having a width of at least 5 mm and a thickness of at least 0.5 mm and extending substantially the whole length of the liner, the liner being positioned around the substrate and within the sleeve; the elements of the liner conforming to a change in cross-sectional size of the substrate and being interconnected by means which permitted a variation in separation between them, without the elements twisting, along the change in cross-section of the substrate.

29. A combination according to claim 28, wherein the substrate is a joint between two cables in which the joint region is of larger cross-sectional size than the cables jointed.

30. A combination according to claim 29, which additionally comprises means for connecting ends of the liner respectively to the cables at either side of the joint.

31. A combination according to claim 30, in which the cables each have a metal armor, and said means for connecting provides electrical connection between the liner and the metal armor of each cable.

32. A combination according to claim 31, in which said means for connecting comprises solder.

33. A combination according to claim 31, in which said means for connecting comprises a clamp at each end of the liner.

34. A method of enclosing an elongate substrate of non-uniform cross-sectional size, which comprises:
   (a) wrapping longitudinally around the substrate a liner comprising:
      (i) a plurality of side-by-side elongate elements of metal substantially rectangular in cross-section having a width of at least 5 mm and a thickness of at least 0.5 mm, and extending the whole length of the liner;
      (ii) means which holds the elements together such that the separation between the elongate elements can vary at a change in cross-sectional size of the substrate;
   (b) placing around the liner a recoverable sleeve; and
   (c) recovering the sleeve into engagement with the substrate.

35. A method according to claim 34, in which the sleeve is heat-shrinkable, and step (c) comprises heating.

36. A method according to claim 35, in which the sleeve has heat-activatable adhesive on an internal surface, and step (c) additionally causes activation of the adhesive.

* * * * *